US012794050B2

United States Patent
(12) United States Patent
An et al.

(10) Patent No.: US 12,794,050 B2
(45) Date of Patent: Nov. 10, 2026

(54) SECONDARY BATTERY, METHOD FOR MANUFACTURING THE SECONDARY BATTERY, AND BATTERY PACK COMPRISING THE SECONDARY BATTERY

(71) Applicant: LG Energy Solution, Ltd., Seoul (KR)

(72) Inventors: In Gu An, Daejeon (KR); Ki Woong Kim, Daejeon (KR); Se Young Ahn, Daejeon (KR); Hyoung Sik Choi, Daejeon (KR); Joong Hyuk Jeon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 916 days.

(21) Appl. No.: 17/771,712

(22) PCT Filed: Jul. 15, 2020

(86) PCT No.: PCT/KR2020/009302
§ 371 (c)(1),
(2) Date: Apr. 25, 2022

(87) PCT Pub. No.: WO2021/112363
PCT Pub. Date: Jun. 10, 2021

(65) Prior Publication Data

US 2022/0384886 A1 Dec. 1, 2022

(30) Foreign Application Priority Data

Dec. 3, 2019 (KR) ........................ 10-2019-0159033

(51) Int. Cl.
*H01M 50/186* (2021.01)
*H01M 50/105* (2021.01)
(Continued)

(52) U.S. Cl.
CPC ....... *H01M 50/186* (2021.01); *H01M 50/105* (2021.01); *H01M 50/178* (2021.01); *H01M 50/184* (2021.01); *H01M 50/557* (2021.01)

(58) Field of Classification Search
CPC ............. H01M 50/184; H01M 50/105; H01M 50/186; H01M 50/183; H01M 4/00–2300/0097
See application file for complete search history.

(56) References Cited

U.S. PATENT DOCUMENTS

2006/0210872 A1 9/2006 Yageta et al.
2007/0231683 A1 10/2007 Lee et al.
(Continued)

FOREIGN PATENT DOCUMENTS

CN 1771615 A 5/2006
CN 101411005 A 4/2009
(Continued)

OTHER PUBLICATIONS

International Search Report for PCT/KR2020/009302 dated Oct. 15, 2020. 3 pgs.
(Continued)

*Primary Examiner* — Mark Ruthkosky
*Assistant Examiner* — Sarah J Jacobson
(74) *Attorney, Agent, or Firm* — Lerner David LLP

(57) ABSTRACT

Disclosed herein are a secondary battery, a method for manufacturing the secondary battery, and a battery pack comprising the secondary battery.
The secondary battery may comprises a sealing part formed on a pouch type exterior. The sealing part may comprise a main sealing part formed along a circumference of the recess part, and a protruding sealing part protruding from the main sealing part toward the electrode assembly. The protruding sealing part may comprise a first protruding sealing part
(Continued)

formed between the first electrode lead and the second electrode lead, and a second protruding sealing part provided at a left side of the first electrode lead.

4 Claims, 8 Drawing Sheets

(51) Int. Cl.

| | |
|---|---|
| ***H01M 50/178*** | (2021.01) |
| ***H01M 50/184*** | (2021.01) |
| ***H01M 50/557*** | (2021.01) |

(56) References Cited

U.S. PATENT DOCUMENTS

| | | | | |
|---|---|---|---|---|
| 2010/0047685 | A1 | 2/2010 | Lee et al. | |
| 2010/0255368 | A1* | 10/2010 | Park | H01M 50/3425 429/185 |
| 2011/0274955 | A1* | 11/2011 | Park | H01M 50/105 429/94 |
| 2013/0130098 | A1 | 5/2013 | Lee et al. | |
| 2013/0216880 | A1 | 8/2013 | Park et al. | |
| 2014/0050955 | A1 | 2/2014 | Mank et al. | |
| 2015/0089800 | A1 | 4/2015 | Kim et al. | |
| 2021/0351463 | A1 | 11/2021 | Park et al. | |

FOREIGN PATENT DOCUMENTS

| | | | |
|---|---|---|---|
| CN | 105453328 | A | 3/2016 |
| EP | 2876724 | A1 | 5/2015 |
| JP | 2007265738 | A | 10/2007 |
| JP | 2009-532824 | A | 9/2009 |
| JP | 2010-501981 | A | 1/2010 |
| JP | 4920111 | B2 | 4/2012 |
| JP | 5732687 | B2 | 6/2015 |
| KR | 20070098399 | A | 10/2007 |
| KR | 20080017264 | A | 2/2008 |
| KR | 2008-0037868 | A | 5/2008 |
| KR | 20120063236 | A | 6/2012 |
| KR | 20150037077 | A | 4/2015 |
| KR | 20150045623 | A | 4/2015 |
| KR | 20150072236 | A | 6/2015 |
| KR | 20170020996 | A | 2/2017 |
| KR | 20180093482 | A | 8/2018 |
| KR | 101933655 | B1 | 12/2018 |

OTHER PUBLICATIONS

Extended European Search Report for Application No. 20895913.0 dated Mar. 7, 2023. 9 pgs.

* cited by examiner

SECONDARY BATTERY, METHOD FOR MANUFACTURING THE SECONDARY BATTERY, AND BATTERY PACK COMPRISING THE SECONDARY BATTERY

CROSS-REFERENCE TO RELATED APPLICATION

The present application is a national phase entry under 35 U.S.C. § 371 of International Application No. PCT/KR2020/009302 filed on Jul. 15, 2020, which claims the benefit of the priority of Korean Patent Application No. 10-2019-0159033, filed on Dec. 3, 2019, all of which are hereby incorporated herein by reference in their entirety.

TECHNICAL FIELD

The present invention relates to a secondary battery, a method for manufacturing the secondary battery, and a battery pack comprising the secondary battery, and more particularly, to a secondary battery having a structure that is capable of minimizing movement of an electrode assembly inside the secondary battery and minimizing a loss of an electrolyte in a process of manufacturing the secondary battery, a method for manufacturing the secondary battery, and a battery pack comprising the secondary battery.

BACKGROUND ART

Secondary batteries that are repetitively chargeable and dischargeable may be divided into pouch type secondary batteries, prismatic type secondary batteries, and cylindrical type secondary batteries according to their manufacturing method and structure. Among them, a pouch type secondary battery is widely used because of its simple structure and high electric capacity per unit volume.

Generally, in the pouch type secondary battery, a cup having a recessed shape is formed in a pouch type sheet, an electrode assembly is accommodated in the cup, and an electrolyte is injected. Thereafter, a process of activating the electrode assembly and discharging a gas existing in the pouch is performed.

However, according to the related art, there is a problem in that the electrode assembly in the pouch type sheet is movable in a series of processes of manufacturing the pouch type secondary battery, and thus, the position of the electrode assembly is uncertain.

In addition, according to the prior art, in the process of discharging the gas after activating the electrode assembly, there is also a problem in that the electrolyte is discharged together with the gas to deteriorate performance of the secondary battery.

DISCLOSURE OF THE INVENTION

Technical Problem

Accordingly, an object of the present invention for solving the above problems is to solve the problem of the movement of the electrode assembly, which occurs while the pouch type secondary battery is manufactured, and solve the problem of the deterioration of the performance of the secondary battery due to the discharge of the electrolyte.

Technical Solution

According to a first aspect of the present invention for achieving the above object, a secondary battery comprises: an electrode assembly in which electrodes and separators are alternately disposed; a pouch type exterior configured to accommodate the electrode assembly; and an electrode lead electrically connected to the electrode assembly to protrude outward, wherein the pouch type exterior comprises: a recess part having a recessed shape to accommodate the electrode assembly; and a sealing part formed by attaching portions the pouch type exterior to each other so as to seal the recess part from the outside, wherein the electrode lead protrudes from one side of the electrode assembly via the sealing part, and the electrode lead comprises: a first electrode lead protruding upward from an upper circumference of the electrode assembly; and a second electrode lead spaced apart from the first electrode lead to a right side and protruding upward from the upper circumference of the electrode assembly, wherein the sealing part comprises: a main sealing part formed along a circumference of the recess part; and a protruding sealing part protruding from the main sealing part toward the electrode assembly, wherein the protruding sealing part comprises: a first protruding sealing part formed between the first electrode lead and the second electrode lead; and a second protruding sealing part provided at a left side of the first electrode lead.

The second protruding sealing part may be provided on an area out of a width (W) in a left and right direction of the electrode assembly.

The first protruding sealing part and the second protruding sealing part may have the same size and shape.

The first protruding sealing part and the second protruding sealing part may have different sizes or shapes.

A lower end of the second protruding part may be provided below an upper end of the electrode assembly.

The protruding sealing part may further comprise a third protruding sealing part and a fourth protruding sealing part, which are formed at an opposite side of the upper circumference of the electrode assembly, on which the first electrode lead and the second electrode lead are provided.

The third sealing part may be formed at a position facing the first protruding sealing part, and the fourth protruding sealing part may be formed at a position facing the second sealing part.

According to a second aspect of the present invention for achieving the above object, a battery pack comprising the secondary battery is provided.

According to a third aspect of the present invention for achieving the above object, a method for manufacturing a secondary battery comprises: a first step of preparing an electrode assembly in which electrodes and separators are alternately disposed, a pouch type exterior in which a recess part having a recessed shape is formed, an electrode lead comprising a first electrode lead and a second electrode lead, and an electrolyte; second step of accommodating the electrode assembly and the electrolyte in the recess part and attaching portions of the pouch type exterior to each other to form a sealing part, wherein the electrode lead protrudes upward from an upper circumference of the electrode assembly via the sealing part; a third step of activating the electrode assembly; and a fourth step of discharging a gas generated in the recess part in the third step to the outside, wherein, in the second step, the sealing part is formed to comprise a main sealing part formed along a circumference of the recess part and a protruding sealing part protruding from the main sealing part toward the electrode assembly, wherein the protruding sealing part comprises a first protruding sealing part formed between the first electrode lead and the second electrode lead and a second protruding sealing part provided at a left side of the first electrode lead, and in the fourth step, at least a portion of the gas is discharged to the outside to successively pass through a space between the first protruding sealing part and the electrode assembly and a space between the second protruding sealing part and the electrode assembly.

In the fourth step, the gas may be discharged through a hole (H) formed in one area of the pouch type exterior, the method may further comprise a fifth step of cutting and removing a portion of the area of the pouch type exterior, in which the hole (H) is formed, and the fifth step may be performed after the fourth step.

The portion of the pouch type exterior, which is cut in the fifth step, may not comprise the second protruding sealing part.

The portion of the pouch type exterior, which is cut in the fifth step, may comprise the second protruding sealing part.

Advantageous Effects

Accordingly, according to the present invention, the problem of the movement of the electrode assembly, which occurs while the pouch type secondary battery is manufactured, may be solved, and the problem of the deterioration of the performance of the secondary battery due to the discharge of the electrolyte may be solved.

MODE FOR CARRYING OUT THE INVENTION

Hereinafter, a secondary battery, a battery pack, and a method for manufacturing the secondary battery according to the present invention will be described with reference to the drawings.

Secondary Battery and Battery Pack

Figure 1:
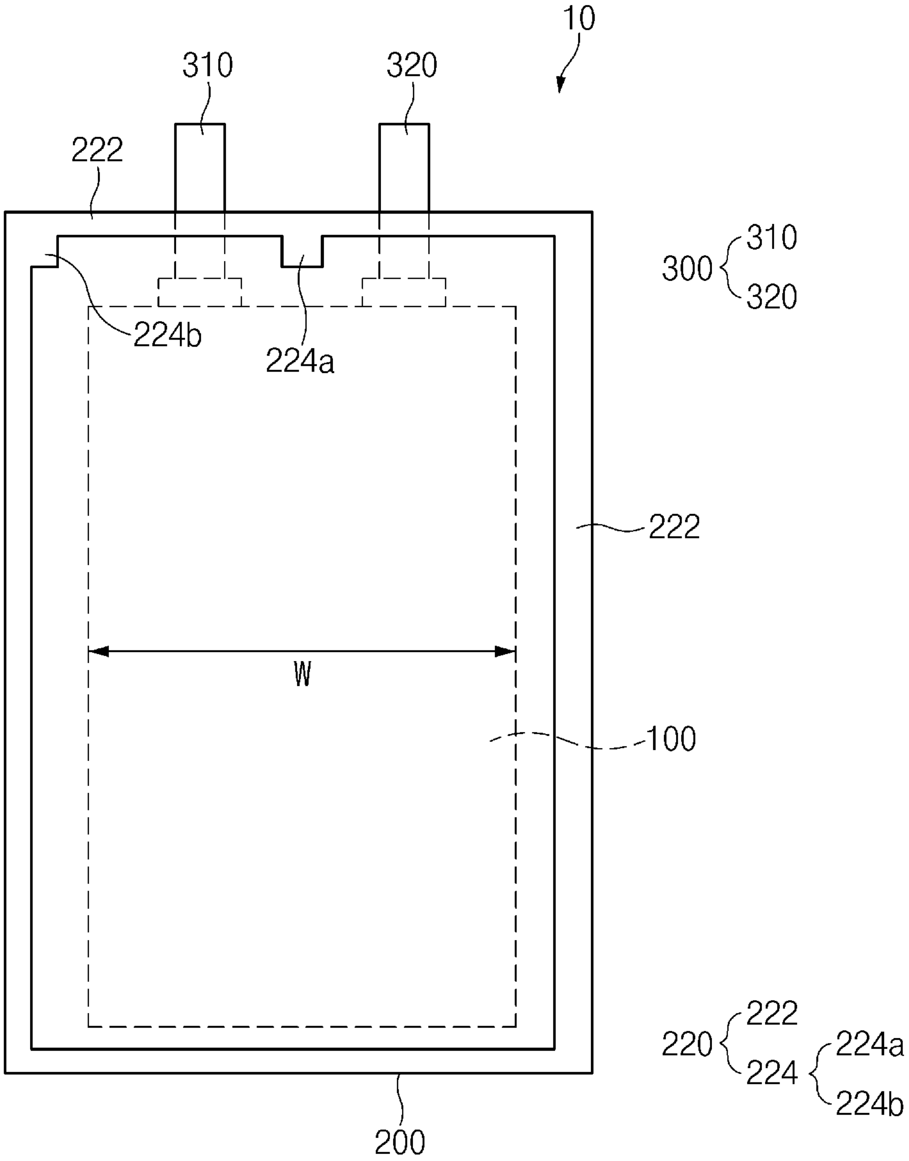
FIG. 1 is a plan view illustrating a secondary battery according to a first embodiment of the present invention.
Figure 2:
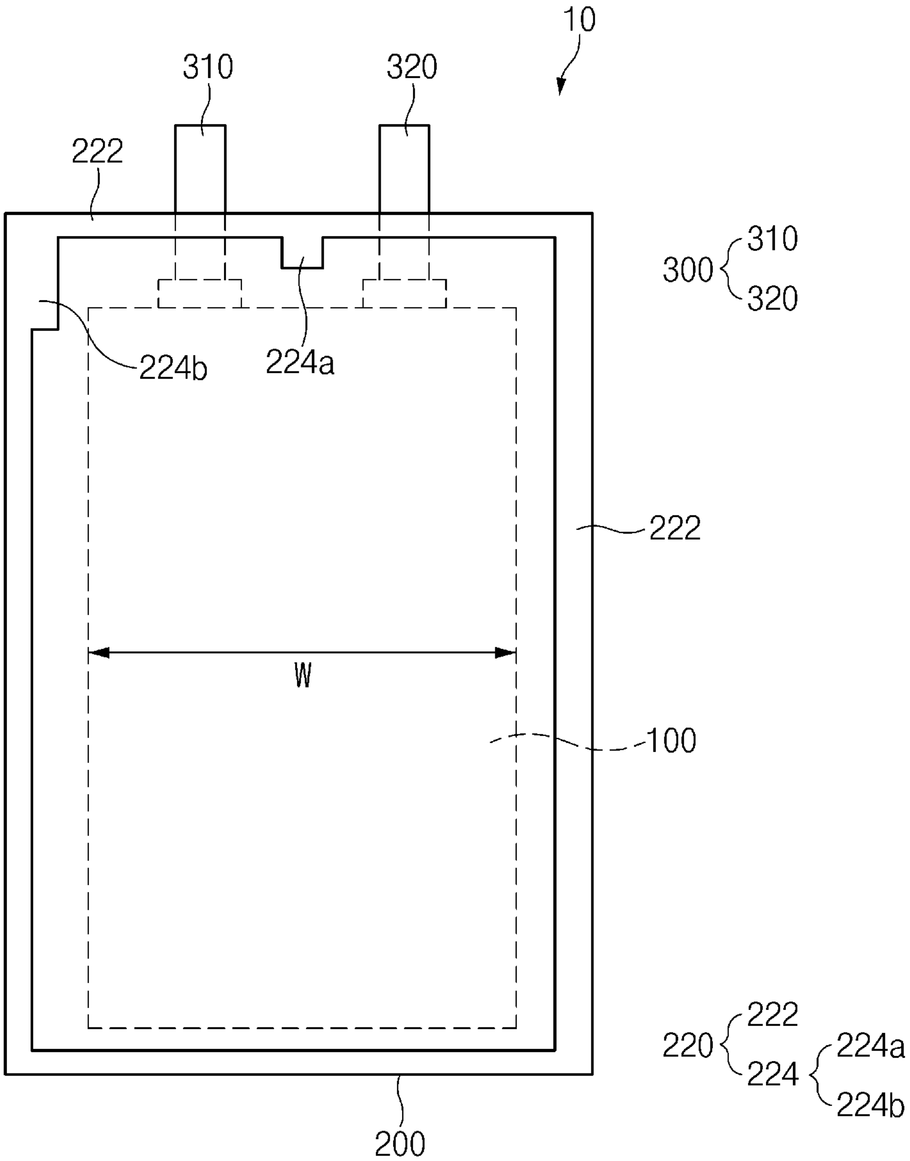
FIG. 2 is a plan view illustrating a secondary battery according to a second embodiment of the present invention.
Figure 3:
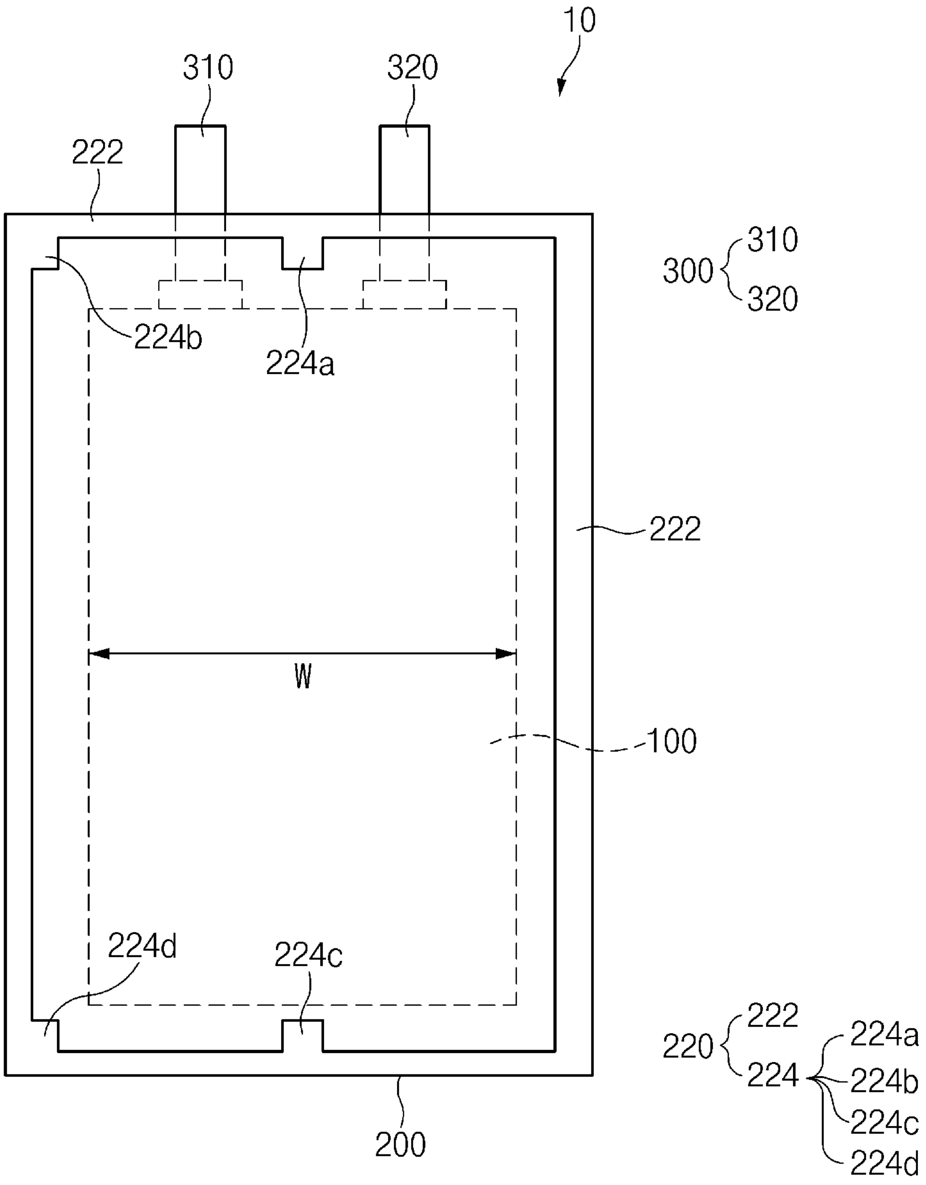
FIG. 3 is a plan view illustrating a secondary battery according to a third embodiment of the present invention.
Figure 6:
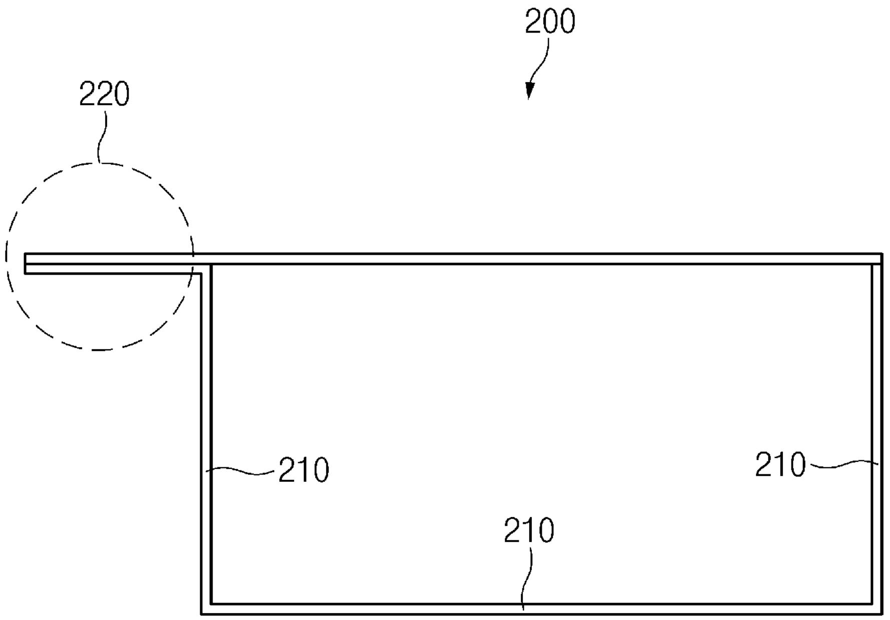
FIG. 6 is a vertical cross-sectional view illustrating a pouch type exterior of a secondary battery according to the present invention.

FIG. 1 is a plan view illustrating a structure of a secondary battery according to a first embodiment of the present invention, and FIG. 2 is a plan view illustrating a structure of a secondary battery according to a second embodiment of the present invention. FIG. 3 is a plan view illustrating a structure of a secondary battery according to a third embodiment of the present invention, and FIG. 6 is a vertical cross-sectional view illustrating a structure of a pouch type exterior of a secondary battery according to the present invention. The secondary battery according to the present invention may be a pouch type secondary battery.

As illustrated in FIGS. 1 to 3, a secondary battery 10 according to the present invention may comprise an electrode assembly 100 and a pouch type exterior 20 accommodating the electrode assembly 100. The electrode assembly 100 may have a structure in which electrodes and separators are alternately disposed.

Here, as illustrated in FIG. 6, the pouch type exterior 200 of the secondary battery 10 may comprise a recess part 210 having a recessed shape to accommodate the electrode assembly 100 and a sealing part 220 formed by attaching portions of the pouch type exterior 200 to each other so as to seal the recess part 210 from the outside.

Referring again to FIGS. 1 to 3, the secondary battery 10 according to the present invention may further comprise an electrode lead 300 electrically connected to the electrode assembly 100. The electrode lead 300 may protrude from one side of the electrode assembly 100 to the outside via the sealing part 220. That is, one end of the electrode lead 300 may be provided at one side of the electrode assembly 100, and the other end of the electrode lead 300, which is opposite to the one end, may be provided outside.

The electrode lead 300 may comprise a first electrode lead 310 and a second electrode lead 320. The first electrode lead 310 and the second electrode lead 320 may be electrically connected to electrodes which have different polarities in the electrode assembly 100, respectively. For example, when the first electrode lead 310 is electrically connected to a positive electrode of the electrode assembly 100, the second electrode lead 320 may be electrically connected to a negative electrode of the electrode assembly 100.

According to the present invention, the first electrode lead 310 and the second electrode lead 320 may protrude in the same direction from one side of a circumference of the electrode assembly 100. For example, as illustrated in FIGS. 1 to 3, each of the first electrode lead 310 and the second electrode lead 320 may protrude upward from an upper circumference of the electrode assembly 100, and the second electrode lead 320 may be spaced apart from the first electrode lead 310 to a right side.

As illustrated in FIGS. 1 to 3, the sealing part 220 of the secondary battery 10 may comprise a main sealing part 222 formed along a circumference of the recess part 210. Here, the main sealing part 222 may be formed to have a predetermined width along the circumference of the recess part 210. For example, referring to FIGS. 1 to 3, when a circumference of the pouch type exterior 200 has a rectangular shape, the main sealing part 222 formed on a left circumference of the pouch type exterior 200 has a first width, and the main sealing part 222 formed on an upper circumference of the pouch type exterior 200 may have a second width. Also, the main sealing part 222 formed on a right circumference of the pouch type exterior 200 may have a third width.

Also, the sealing part 220 may further comprise a protruding sealing part 224 protruding from the main sealing part 222 toward the electrode assembly 100. As illustrated in FIGS. 1 to 3, the protruding sealing part 224 comprises a first protruding sealing part 224*a* formed between the first electrode lead 310 and the second electrode lead 320 and a second protruding sealing part 224*b* provided at a left side of the first electrode lead 310.

The protruding sealing part 224 according to the present invention may be a constituent for preventing the electrode assembly 100 accommodated in the pouch type exterior 200 from moving in the secondary battery 10. That is, in general, the recess part 210 formed in the pouch type exterior 200 may have a size greater than that of the electrode assembly 100 so that the electrode assembly 100 is smoothly accommodated in the pouch type exterior 200. However, in this case, the electrode assembly 100 is movable due to a difference in size between the recess part 210 and the electrode assembly 100. In this case, uncertainty in position of the electrode assembly 100 increases, and damage of the electrode assembly 100 may occur. However, according to the present invention, since the protruding sealing part 224 is formed on the secondary battery 10, the vertical movement of the electrode assembly 100 in the recess part 210 may be prevented to reduce the uncertainty in position of the electrode assembly 100 and also minimize the damage of the electrode assembly 100. Also, as described later, the protruding sealing part 224 may also serve to prevent an electrolyte from leaking to the outside while the secondary battery 10 is manufactured.

Referring again to FIGS. 1 to 3, the second protruding sealing part 224*b* of the protruding sealing part 224 of the secondary battery 10 according to the present invention may be provided on an area out of a width W in a left and right direction of the electrode assembly 100.

Also, as illustrated in FIG. 1, according to the first embodiment of the present invention, the first protruding sealing part 224*a* and the second protruding sealing part 224*b* may have the same size and shape. However, as illustrated in FIG. 2, according to the second embodiment of the present invention, the first protruding sealing part 224*a* and the second protruding sealing part 224*b* may have different sizes or shapes.

In more detail, according to the second embodiment of the present invention, a lower end of the second protruding sealing part 224*b* may be provided below an upper end of the electrode assembly 100. In this case, the second protruding sealing part 224*b* may prevent not only the electrode assembly 100 from moving in the vertical direction, but also the electrode assembly 100 from moving in the left and right direction.

As illustrated in FIG. 3, according to the third embodiment of the present invention, the protruding sealing part 224 may further comprise a third protruding sealing part 224*c* and a fourth protruding sealing part 224*d*, which are formed on the lower circumference of the electrode assembly 100, which is formed at an opposite side of the upper circumference of the electrode assembly 100, on which the first electrode lead 310 and the second electrode lead 320 are provided, in addition to the first protruding sealing part 224*a* and the second protruding sealing part 224*b*.

Here, the third protruding sealing part 224*c* may be formed at a position facing the first protruding sealing part 224*a*, and the fourth protruding sealing part 224*d* may be formed at a position facing the second protruding sealing part 224*b*.

Also, the third protruding seal part 224*c* and the fourth protruding seal part 224*d* may have the same size and shape. Alternatively, the third protruding seal part 224*c* and the fourth protruding seal part 224*d* may have different sizes or shapes.

Also, similar to the case of the second protruding seal part 224*b* of the second embodiment of the present invention, according to an example of the third embodiment of the present invention, an upper end of the fourth protruding seal part 224*d* may be provided above a lower end of the electrode assembly 100.

Figure 4:
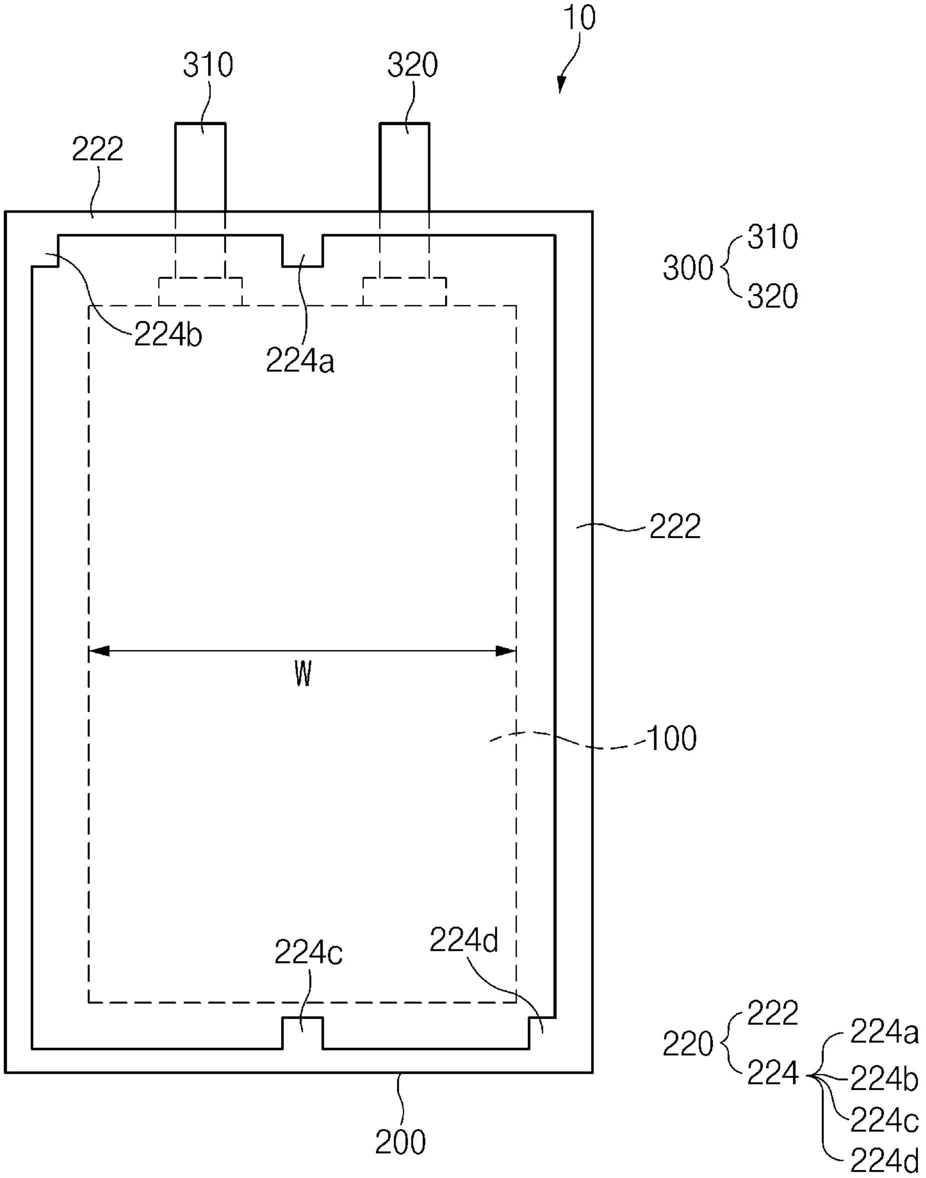
FIG. 4 is a plan view illustrating a secondary battery according to a fourth embodiment of the present invention.

As illustrated in FIG. 4, according to the fourth embodiment of the present invention, the protruding sealing part 224 may further comprise a third protruding sealing part 224*c* and a fourth protruding sealing part 224*d*, which are formed on the lower circumference of the electrode assembly 100, which is formed at an opposite side of the upper circumference of the electrode assembly 100, on which the first electrode lead and the second electrode lead 320 are provided, in addition to the first protruding sealing part 224*a* and the second protruding sealing part 224*b*.

Here, unlike the third embodiment of the present invention, according to the fourth embodiment of the present invention, the second protruding sealing part 224*b* and the fourth protruding sealing part 224*d* may not be provided at positions facing each other. That is, as illustrated in FIG. 4, according to the fourth embodiment of the present invention, the second protruding sealing part 224*b* and the fourth protruding sealing part 224*d* may be provided on a diagonal line, which connects corners of the pouch type exterior 200 to each other, with the electrode assembly 100 therebetween.

Figure 5:
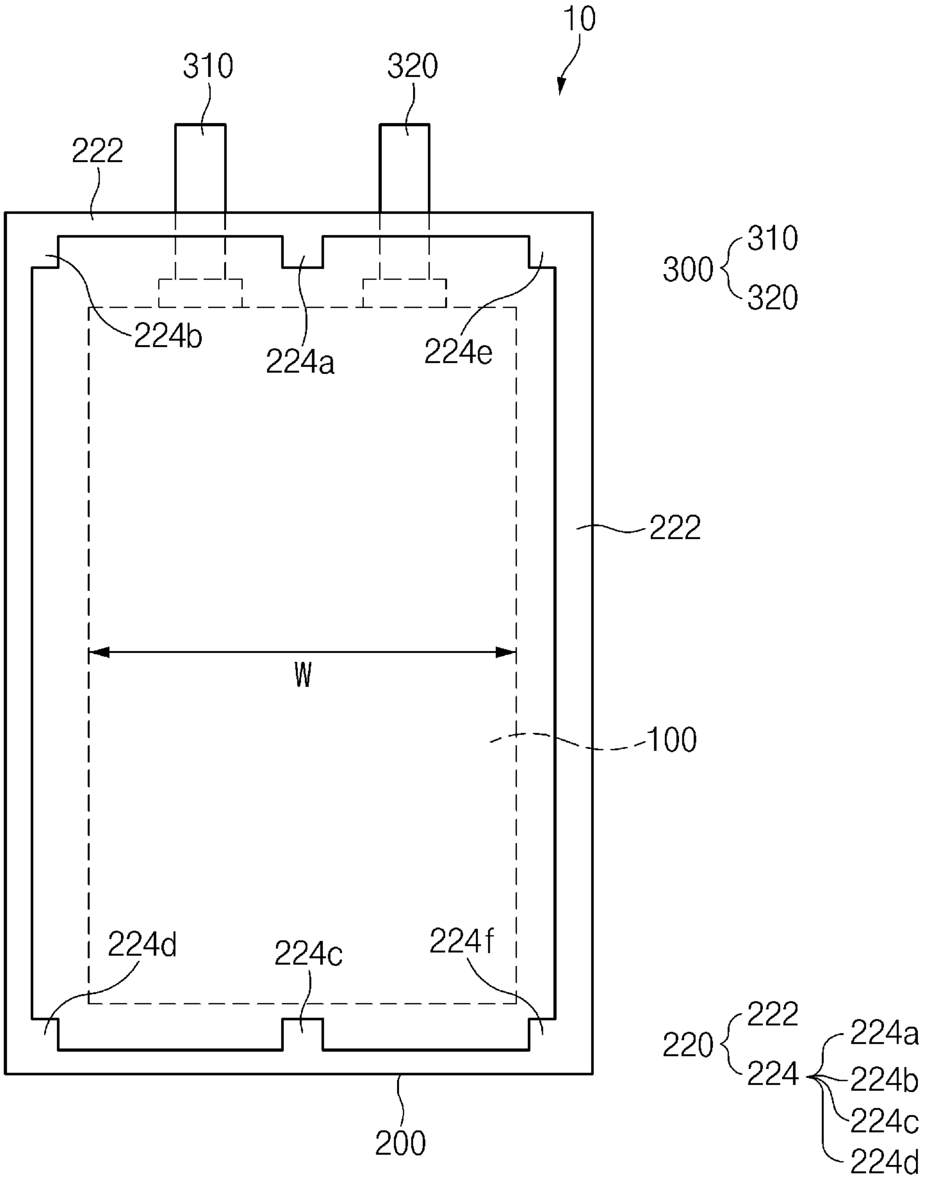
FIG. 5 is a plan view illustrating a secondary battery according to a fifth embodiment of the present invention.

As illustrated in FIG. 5, according to the fifth embodiment of the present invention, the protruding sealing part 224 may further comprise a third protruding sealing part 224*c* and a fourth protruding sealing part 224*d*, which are formed on the lower circumference of the electrode assembly 100, which is formed at an opposite side of the upper circumference of the electrode assembly 100, on which the first electrode lead and the second electrode lead 320 are provided, in addition to the first protruding sealing part 224*a* and the second protruding sealing part 224*b*. Here, the third protruding sealing part 224*c* may be formed at a position facing the first protruding sealing part 224*a*, and the fourth protruding sealing part 224*d* may be formed at a position facing the second protruding sealing part 224*b*.

In addition, according to the fifth embodiment of the present invention, the protruding sealing part 224 may further comprise a fifth protruding sealing part 224*e* and a sixth protruding sealing part 224*f*. Here, the fifth protruding sealing part 224*e* may be provided at an opposite side of the second protruding sealing part 224*b* with the first protruding sealing part 224*a* therebetween, and the sixth protruding sealing part 224*f* may be provided at an opposite side of the fourth protruding sealing part 224*d* with the third protruding sealing part 224*c* therebetween. Thus, the fifth protruding sealing part 224*e* and the sixth protruding sealing part 224*f* may be provided to face each other.

Method for Manufacturing Secondary Battery

Figure 7:
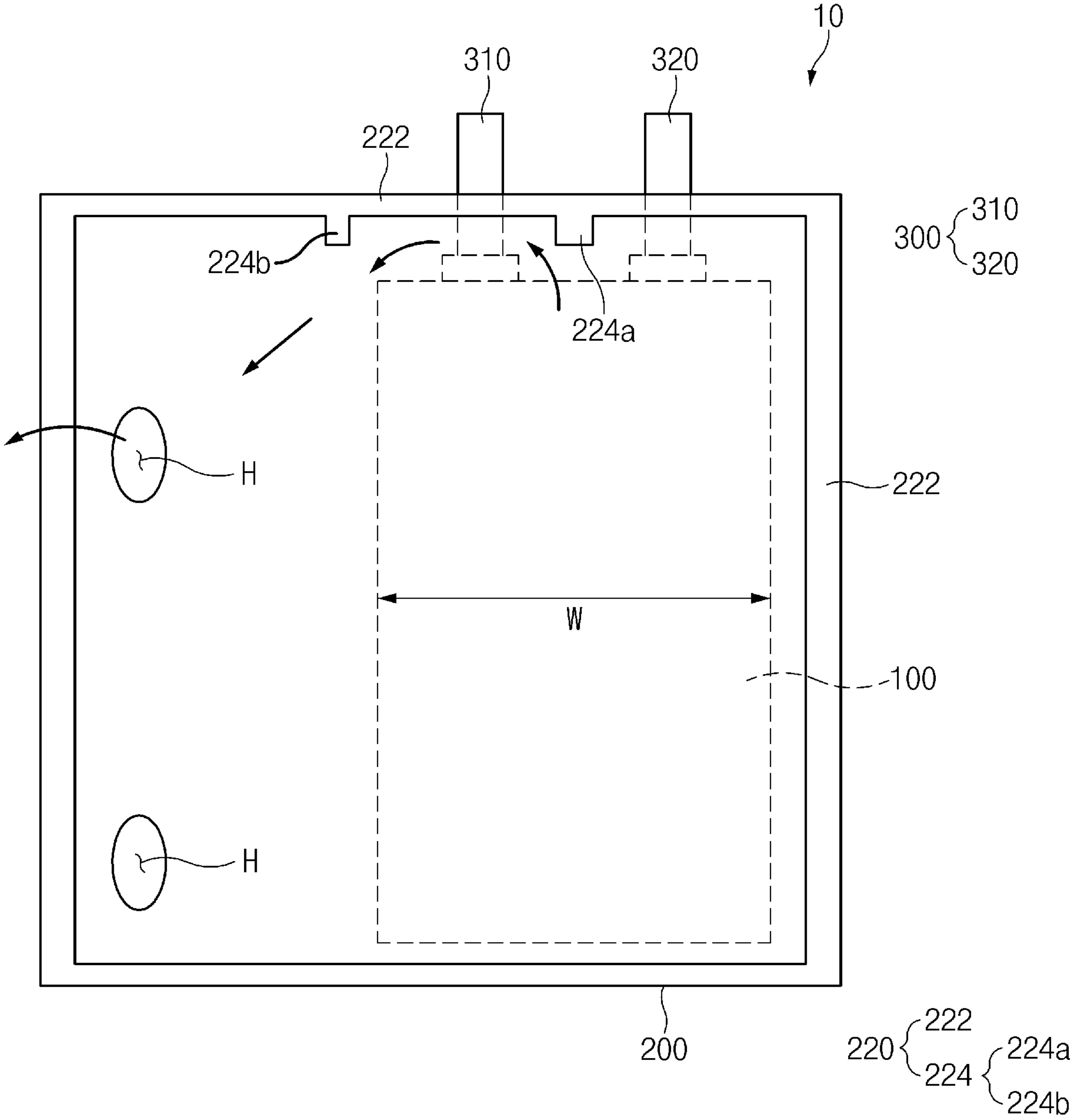
FIG. 7 is a plan view illustrating a step of discharging a gas to the outside according to a method for manufacturing a secondary battery of the present invention.
Figure 8:
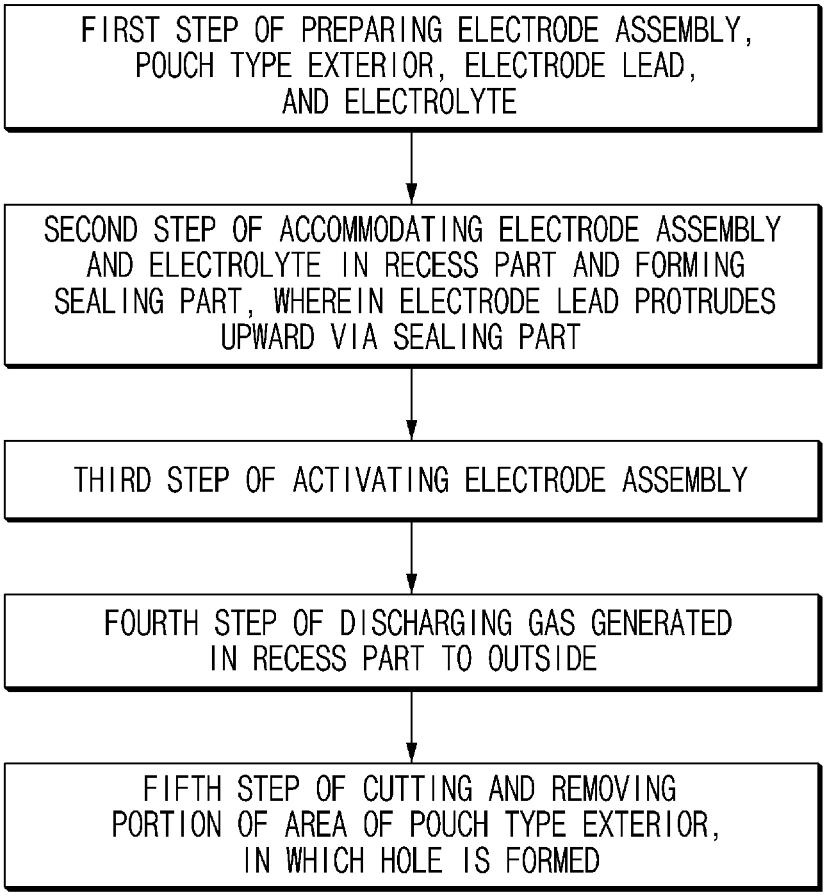
FIG. 8 is a flowchart illustrating the method for manufacturing the secondary battery according of the present invention.

FIG. 7 is a plan view illustrating a step of discharging a gas to the outside in a method for manufacturing a secondary battery according to the present invention, and FIG. 8 is a flowchart illustrating the method for manufacturing the secondary battery according to the present invention.

As illustrated in FIG. 8, a method for manufacturing a secondary battery according to the present invention may comprise a first step of preparing an electrode assembly in which electrodes and separators are alternately disposed, a pouch type exterior in which a recess part 210 (see FIG. 6) having a recessed shape is formed, an electrode lead comprising a first electrode lead and a second electrode lead, and an electrolyte.

Also, as illustrated in FIGS. 7 and 8, the method for manufacturing the secondary battery according to the present invention may comprise a second step of accommodating the electrode assembly and the electrolyte in the recess part 210 and attaching portions of the pouch type exterior 200 to each other to form a sealing part 220, wherein the electrode lead 300 protrudes upward from an upper circumference of the electrode assembly 100 via the sealing part 220.

Also, the method for manufacturing the secondary battery according to the present invention may comprise a third step of charging and discharging the electrode assembly 100 accommodated in the recess part 210 of the pouch type exterior 200 to activate the electrode assembly 100 and a fourth step of discharging a gas generated in the recess part 210 of the pouch type exterior 200 in the third step to the outside. The gas discharged to the outside in the fourth step may be a gas generated during the activation process of the electrode assembly in the third step.

Here, according to the present invention, in the second step, the sealing part 220 may comprise a main sealing part 222 formed along a circumference of the recess part 210 and a protruding sealing part 224 protruding from the main sealing part 222 toward the electrode assembly 100. Also, in the second step, the protruding sealing part 224 may comprise a first protruding sealing part 224*a* formed between the first electrode lead 310 and the second electrode lead 320 and a second protruding sealing part 224*b* provided at a left side of the first electrode lead 310.

Also, according to the present invention, at least a portion of the gas discharged to the outside in the fourth step may be discharged to the outside to successively pass through (i) a space between the first protruding sealing part 224*a* and the electrode assembly 100 and (ii) a space between the second protruding sealing part 224*b* and the electrode assembly 100.

The gas generated in the process of activating the electrode assembly is discharged to the outside to successively pass through a space between the sealing part and the electrode assembly as a region between the first electrode lead and the second electrode lead and a space between an edge of the electrode assembly and the sealing part.

However, in the process of discharging the gas, since not only the gas but also a portion of the electrolyte are discharged through the same path as the discharge path of the gas, a problem due to leakage of the electrolyte may occur.

Thus, according to the present invention, the protruding sealing part may be formed on the path along which the gas and the electrolyte flows in the vicinity of the electrode lead to induce a kind of bottleneck phenomenon while the electrolyte flows, thereby minimizing the electrolyte from being unnecessarily discharged to the outside. Particularly, in the case of the gas, since the gas has high compressibility, there is no significant effect on the discharge to the outside even if the protruding sealing part is formed to reduce a width of a passage. However, in the case of the liquid electrolyte, since the electrolyte has significantly low compressibility, the passage may be reduced in width when the protruding sealing part is formed. As a result, the discharge of the electrolyte to the outside maybe suppressed.

Subsequently, referring to FIG. 7, in the fourth step, the gas may be discharged through a hole H formed in one area of the pouch type exterior 200.

Also, the method for manufacturing the secondary battery according to the present invention may further comprise a fifth step of cutting and removing a portion of the area of the pouch type exterior 200, in which the hole H is formed. Here, the fifth step may be performed after the fourth step.

According to an example of the present invention, the portion of the pouch type exterior 200, which is cut in the fifth step, may not comprise the second protruding sealing part 224*b*. In this case, after the fifth step, the secondary battery 10 may comprise the second protruding sealing part 224*b* as illustrated in FIG. 1 or 2.

On the other hand, according to another example of the present invention, the portion of the pouch type exterior 200, which is cut in the fifth step, may comprise the second protruding sealing part 224*b*. In this case, after the fifth step, the secondary battery 10 may not comprise the second protruding sealing part 224*b*, unlike FIGS. 1 and 2.

According to another example of the present invention, in the second step, the sealing part 220 may further comprises a third protruding sealing part 224*c* formed at a position facing the first protruding sealing part 224*a* with the electrode assembly 100 therebetween and a fourth protruding sealing part 224*d* formed at a position facing the second protruding sealing part 224*b* with the electrode assembly 100 therebetween in addition to the first protruding sealing part 224*a* and the second protruding sealing part 224*b*.

The gas generated in the step of activating the electrode assembly, i.e., in the third step may also be discharged through a circumference (a lower circumference of the electrode assembly in FIG. 7) formed at an opposite side of one circumference (an upper circumference of the electrode assembly in FIG. 7) of the electrode assembly, on which the electrode lead is provided. Therefore, since the third protruding sealing part 224*c* and the fourth protruding sealing part 224*d* are also formed on an area adjacent to the lower circumference of the electrode assembly, an effect similar to the effect that is exerted by the first protruding sealing part 224*a* and the second protruding sealing part 224*b*, i.e., an effect of suppressing the discharge of the electrolyte may be exhibited.

In this case, in the fifth step, the cut portion of the pouch type exterior may not comprise the fourth protruding sealing part 224*d*. In this case, after the fifth step, the secondary battery 10 may comprise the fourth protruding sealing part 224*d* as illustrated in FIG. 3.

On the other hand, in the fifth step, the cut portion of the pouch type exterior may comprise the fourth protruding sealing part 224*d*. In this case, after the fifth step, the secondary battery 10 may not comprise the fourth protruding sealing part 224*d*, unlike FIG. 3.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Secondary battery
100: Electrode assembly
200: Pouch type exterior
210: Recess part
220: Sealing part
222: Main sealing part
224: Protruding sealing part
224*a*: First protruding sealing part
224*b*: Second protruding sealing part
224*c*: Third protruding sealing part
224*d*: Fourth protruding sealing part
300: Electrode lead
310: First electrode lead
320: Second electrode lead
W: Width in left and right direction of electrode assembly
H: Hole

The invention claimed is:

1. A secondary battery comprising:

an electrode assembly including alternately arranged electrodes and separators;

a pouch type exterior to accommodate the electrode assembly; and an electrode lead electrically connected to the electrode assembly and protruding outward therefrom, wherein the pouch type exterior comprises:

a recess part having a recessed shape to accommodate the electrode assembly; and a sealing part formed by attaching portions of the pouch type exterior to each other to seal the recess part from the outside, wherein the electrode lead protrudes from the electrode assembly through the sealing part, and the electrode lead comprising:

a first electrode lead protruding from an upper circumference of the electrode assembly; and a second electrode lead spaced apart from the first electrode lead and protruding from a first side of the upper circumference of the electrode assembly, wherein the sealing part comprises:

a main sealing part continuously formed along a circumference of the recess part to completely surround the electrode assembly; and a protruding sealing part protruding from a side of the main sealing part facing the electrode assembly toward the electrode assembly and located at the inside of the recess part, wherein the protruding sealing part comprises:

a first protruding sealing part formed between the first electrode lead and the second electrode lead; and a second protruding sealing part provided adjacent the first electrode lead and away from the second electrode lead, wherein a shape and a size of the first protruding sealing part are different from a shape and a size of the second protruding sealing part, wherein a lower end of the second protruding sealing part is below an upper end of the electrode assembly, wherein the second protruding sealing part extends downward beyond an upper end of the electrode assembly to overlap a portion of the recess part to restrict movement of the electrode assembly and prevent electrolyte leakage, wherein the protruding sealing part further comprises a third protruding sealing part and a fourth protruding sealing part formed at a second side of the upper circumference of the electrode assembly, the second side being opposite to the first side, wherein the third protruding sealing part is formed facing the first protruding sealing part, and the fourth protruding sealing part is formed facing the second sealing protruding part, wherein the second protruding sealing part is configured to prevent the electrode assembly from moving in a first direction and a second direction, the first direction being perpendicular to the second direction.

2. The secondary battery of claim 1, wherein the second protruding sealing part is located away from a width of the electrode assembly in direction along the width of the electrode assembly.

3. A battery pack comprising the secondary battery of claim 1.

4. A secondary battery comprising:

an electrode assembly including alternately arranged electrodes and separators, the electrode assembly defining a rectangular body having a constant width extending from a top surface of the electrode assembly to a bottom surface of the electrode assembly;

a pouch type exterior to accommodate the electrode assembly; and an electrode lead electrically connected to the electrode assembly and protruding outward from the top surface of the electrode assembly, wherein the pouch type exterior comprises:

a recess part having a recessed shape to accommodate the electrode assembly; and a sealing part formed by attaching portions of the pouch type exterior to each other to seal the recess part from the outside, wherein the electrode lead protrudes from the electrode assembly through the sealing part, and the electrode lead comprising:

a first electrode lead protruding from the top surface of the electrode assembly; and a second electrode lead spaced apart from the first electrode lead and protruding from a first side of the top surface of the electrode assembly, wherein the sealing part comprises:

a main sealing part continuously formed along a circumference of the recess part to completely surround the electrode assembly; and a protruding sealing part protruding from a side of the main sealing part facing the electrode assembly toward the electrode assembly and located at the inside of the recess part, wherein the protruding sealing part comprises:

a first protruding sealing part formed between the first electrode lead and the second electrode lead; and a second protruding sealing part provided adjacent the first electrode lead and away from the second electrode lead, wherein a shape and a size of the first protruding sealing part are different from a shape and a size of the second protruding sealing part, wherein a lower end of the second protruding sealing part is below the top surface of the electrode assembly, wherein the second protruding sealing part extends downward beyond the top surface of the electrode assembly to overlap a portion of the recess part to restrict movement of the electrode assembly and prevent electrolyte leakage, wherein the protruding sealing part further comprises a third protruding sealing part and a fourth protruding sealing part adjacent the bottom surface of the electrode assembly, wherein the third protruding sealing part is formed facing the first protruding sealing part, and the fourth protruding sealing part is formed facing the second sealing protruding part, wherein the second protruding sealing part is configured to prevent the electrode assembly from moving in a first direction and a second direction, the first direction being perpendicular to the second direction.

* * * * *